(12) United States Patent
Koganezawa et al.

(10) Patent No.: US 8,006,499 B2
(45) Date of Patent: Aug. 30, 2011

(54) HUMID AIR TURBINE, HUMID AIR TURBINE CONTROL SYSTEM, AND HUMID AIR TURBINE CONTROL METHOD

(75) Inventors: Tomomi Koganezawa, Hitachi (JP); Yukinori Katagiri, Hitachinaka (JP); Keisuke Miura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 874 days.

(21) Appl. No.: 12/018,574

(22) Filed: Jan. 23, 2008

(65) Prior Publication Data
US 2008/0229755 A1 Sep. 25, 2008

(30) Foreign Application Priority Data
Mar. 19, 2007 (JP) ................. 2007-069745

(51) Int. Cl.
*F02C 3/30* (2006.01)
(52) U.S. Cl. ............ 60/775; 60/39.3; 60/39.53; 60/728; 60/39.511; 60/39.182
(58) Field of Classification Search ............... 60/39.511, 60/728, 39.53, 775, 39.3, 39.281, 776
See application file for complete search history.

(56) References Cited

U.S. PATENT DOCUMENTS

| | | | |
|---|---|---|---|
| 6,260,350 B1 * | 7/2001 | Horii et al. | 60/39.3 |
| 6,289,666 B1 * | 9/2001 | Ginter | 60/775 |
| 6,378,284 B1 * | 4/2002 | Utamura | 60/775 |
| 6,389,799 B1 * | 5/2002 | Hatamiya et al. | 60/39.3 |
| 6,634,165 B2 * | 10/2003 | Tomlinson et al. | 60/39.3 |
| 6,981,360 B2 * | 1/2006 | Yagi et al. | 60/39.5 |
| 7,117,677 B2 * | 10/2006 | Inoue et al. | 60/737 |
| 7,444,819 B2 * | 11/2008 | Shibata et al. | 60/775 |
| 7,587,887 B2 * | 9/2009 | Horiuchi et al. | 60/39.3 |
| 7,757,475 B2 * | 7/2010 | Sasaki et al. | 60/39.5 |
| 7,784,286 B2 * | 8/2010 | Bolis et al. | 60/775 |
| 2001/0020360 A1 * | 9/2001 | Tsukamoto et al. | 60/39.53 |
| 2006/0042264 A1 * | 3/2006 | Inoue et al. | 60/776 |
| 2006/0260290 A1 * | 11/2006 | Rao | 60/39.53 |
| 2008/0060345 A1 * | 3/2008 | Nakano et al. | 60/266 |
| 2009/0038287 A1 * | 2/2009 | Sasaki et al. | 60/39.53 |
| 2010/0229566 A1 * | 9/2010 | Takahashi et al. | 60/772 |
| 2010/0269482 A1 * | 10/2010 | Hirota et al. | 60/39.53 |

FOREIGN PATENT DOCUMENTS

| | | |
|---|---|---|
| JP | 7-280267 | 10/1995 |
| JP | 11-148372 | 6/1999 |
| JP | 11-257096 | 9/1999 |
| JP | 2000-104563 | 4/2000 |
| JP | 2000-230432 | 8/2000 |
| JP | 2003-120934 | 4/2003 |
| JP | 2003-148734 | 5/2003 |
| JP | 2005-214085 | 8/2005 |
| JP | 2005-307861 | 11/2005 |

* cited by examiner

*Primary Examiner* — William H Rodríguez
(74) *Attorney, Agent, or Firm* — Mattingly & Malur, PC (57) ABSTRACT

The present invention provides a humid air turbine having a compressor, a humidificator for generating humid air by adding moisture to compressed air supplied from the compressor, a combustor, a turbine, a recuperator for effecting heat exchange between exhaust from the turbine and the humid air, an economizer for effecting heat exchange between exhaust from the recuperator and water, and a system for supplying the water heated by the economizer to the humidificator. The humid air turbine includes a temperature measurement device for measuring the temperature of gas discharged from the economizer, and a control device for adjusting the amount of moisture to be supplied to the humidificator in accordance with a temperature signal from the temperature measurement device. The present invention assures low NOx of combustor and flame stability before and after water addition to the humid air turbine.

6 Claims, 9 Drawing Sheets

HUMID AIR TURBINE, HUMID AIR TURBINE CONTROL SYSTEM, AND HUMID AIR TURBINE CONTROL METHOD

BACKGROUND OF THE INVENTION

1. Field of the Invention

The present invention relates to a humid air turbine, humid air turbine control system, and humid air turbine control method.

2. Description of the Related Art

A conventional humid air turbine obtains humid air by adding water to compressed air supplied from a compressor, uses the obtained humid air to recover thermal energy possessed by exhaust discharged from the turbine, and uses the recovered thermal energy to increase its output and efficiency. An invention disclosed in JP-A-2005-307861 provides means for exercising control to stabilize the amount of moisture in air without regard to load variations after the start of water addition in a humid air turbine.

When the rotation speed rises at turbine startup, the flow rate of air taken into the compressor and the vibration characteristic of a rotator generally vary. Therefore, system instability is more likely to result from disturbance than after full speed is attained. Particularly, if water addition begins during a rotation speed rise, the humid air turbine is disturbed. It is therefore preferred that water addition be started under partial load, which prevails after full speed is attained, in order to assure stability during turbine startup.

Meanwhile, if natural gas, kerosene, light oil, or other low nitrogen fuel is used, thermal NOx, which is generated when nitrogen in air is oxidized, accounts for the majority of NOx generated by a combustor. The amount of thermal NOx highly depends on temperature and increases with an increase in the temperature. Therefore, the basic idea of a low NOx combustion method is to reduce flame temperature. Premix combustion is known as a flame temperature reduction method that premixes fuel and air and burns the resulting mixture.

Even when combustion air is heated to a high temperature by a recuperator as in a humid air turbine, it is necessary to properly control the flame temperature for NOx reduction purposes while preventing the autoignition of fuel. Under such circumstances, a method disclosed in JP-A-2003-148734 can be effectively used to deliver many small-diameter coaxial jets of fuel and air into a combustion chamber.

SUMMARY OF THE INVENTION

When the humid air turbine starts a water addition process, the amount of moisture in combustion air in the combustor increases. As combustion heat of fuel is absorbed by the moisture in the combustion air, the flame temperature lowers accordingly, thereby decreasing the amount of NOx generation. Further, as turbine working fluid increases in amount due to water addition, an adjustment is made to reduce the amount of fuel for the purpose of maintaining a constant turbine rotation speed. Thus, the flame temperature in the combustor lowers, thereby decreasing the NOx generation amount. In addition, the combustion air temperature lowers because the flame temperature drops to reduce the amount of heat recovered by the recuperator. As described above, the NOx generation amount also decreases when the flame temperature lowers.

When water addition begins, moisture content increase, fuel amount decrease, and combustion air temperature decrease simultaneously take place as described above to lower the flame temperature. This decreases the NOx generation amount, but degrades flame stability.

Under the above circumstances, flame blowout can be avoided by reducing the flow rate of air to be supplied to a premix section on the head of the combustor or the combustion chamber. However, if the air flow rate is reduced, the flame temperature rises adversely before the start of water addition. As a result, the NOx generation amount increases, although flame stability is assured.

In view of the above circumstances, it is an object of the present invention to provide a low NOx combustor and assure flame stability before and after water addition to a humid air turbine.

The present invention includes a temperature measurement device, which measures the temperature of gas discharged from the economizer, and a control device, which adjusts the amount of moisture to be supplied to the humidificator in accordance with a temperature signal from the temperature measurement device.

The present invention makes it possible to provide a low NOx combustor and assure flame stability before and after water addition to a humid air turbine.

1: Compressor
2: Combustor
3: Turbine
4: Humidificator
5: Recuperator
6: Main casing
7: Combustor casing
8: Combustor cover
9: Fuel nozzle
10: Combustor liner
11: Flow sleeve
12: Inner transition duct
13: Outer transition duct
14: Extraction path
20: Power generator
21: Shaft
22: Economizer 23: Exhaust reheater
24: Water recovery system
25: Exhaust tower
26: Water treatment device
27: Water atomization cooling system
30: Fuel header
31: Fuel nozzle
32: Air hole
33: Air hole plate
34: Support
100: Turbine intake air (atmospheric pressure)
101: Water-sprayed air (atmospheric pressure)
102: Compressed air
103: Extraction air
104: Humid air
105: High-temperature air
106: Combustion gas
107: Exhaust
108: Discharged gas
211, 212, 213, 214: Fuel flow control valve
311: Control valve
401, 405: Subtractor
402, 406: Controller
403: Fuel ratio setter
404: Comparator
407: Change rate limiter
408: Fuel flow rate/water amount setter
409: Selector
1000: Humid air turbine

DETAILED DESCRIPTION OF THE PREFERRED EMBODIMENTS

Embodiments of a humid air turbine according to the present invention will now be described with reference to the accompanying drawings.

First Embodiment

Figure 1:
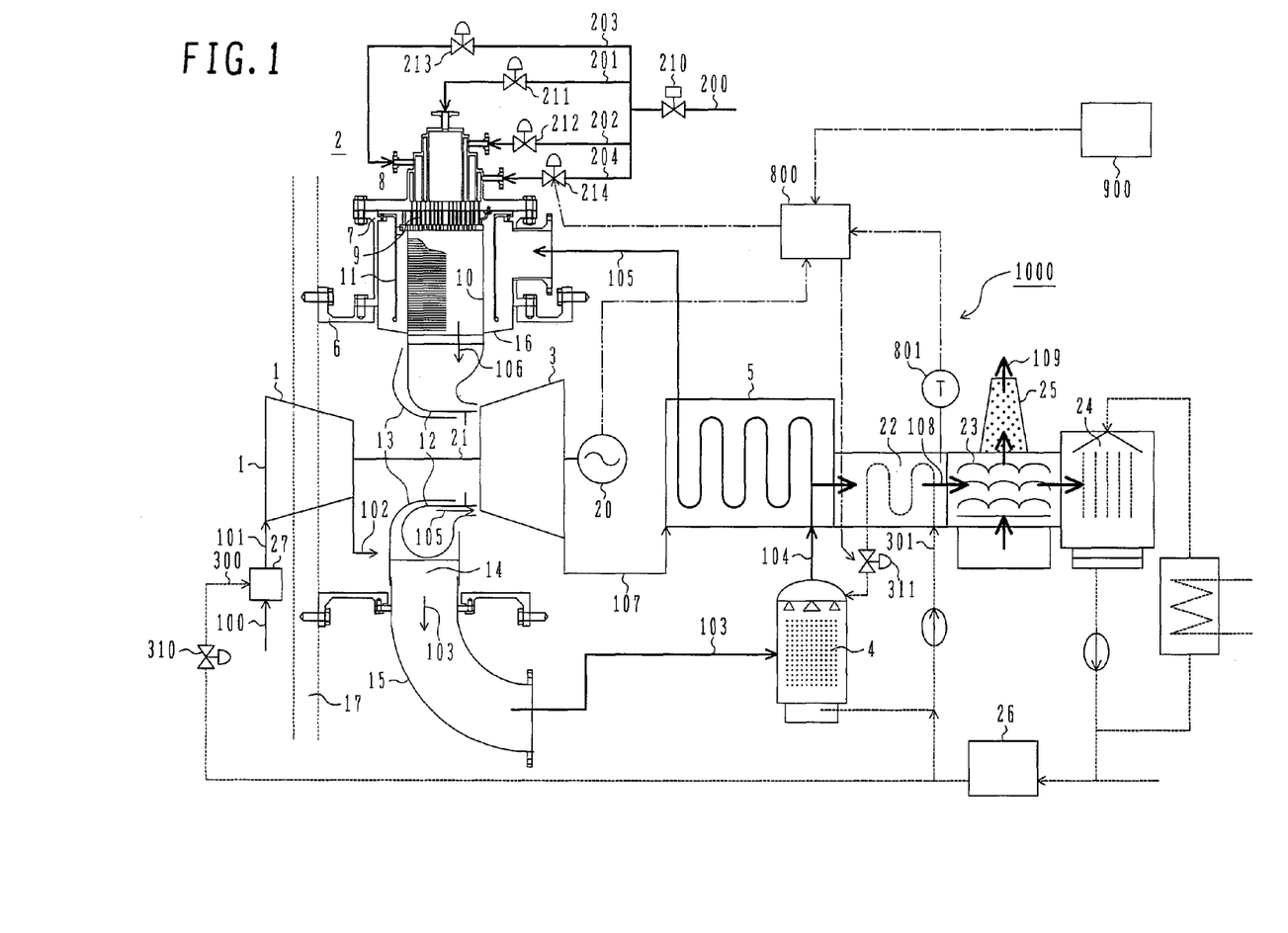
FIG. 1 is a system flow diagram illustrating the configuration of a humid air turbine according to a first embodiment of the present invention.

FIG. 1 is a system flow diagram illustrating the overall configuration of the humid air turbine according to a first embodiment of the present invention.

The humid air turbine 1000 includes a compressor 1 for compressing air, a combustor 2 for generating combustion gas by burning humid air and fuel, a turbine 3 driven by the combustion gas, a humidificator 4 for generating humid air by adding moisture to compressed air supplied from the compressor, and a recuperator 5 for effecting heat exchange between exhaust from the turbine and the humid air, and acquires electrical power by rotating a power generator 20 through the use of an output from the turbine 3.

The combustor 2 is housed inside a main casing 6, a combustor casing 7, and a combustor cover 8. A fuel nozzle 9 is mounted at the center of the upstream end of the combustor 2. A combustor liner 10, which is substantially cylindrical in shape, is positioned downstream of the fuel nozzle 9 to separate unburned air from burned combustion gas. The outer circumference of the combustor liner 10 is provided with an external wall (hereinafter referred to as the flow sleeve 11), which forms an air flow path to exercise flow control. The flow sleeve 11 is larger in diameter than the combustor liner 10 and substantially concentric with the combustor liner 10. An inner transition duct 12 is positioned downstream of the combustor liner 10 to direct the combustion gas to the turbine 3. An outer transition duct 13 is positioned outside the inner transition duct 12.

The humid air turbine according to the present embodiment also includes a water atomization cooling system 27, which sprays water 300 over turbine intake air 100 at the inlet of the compressor 1. The water-sprayed air 101 (atmospheric pressure) is compressed by the compressor 1 to obtain compressed air 102. The compressed air 102 then fills the main casing 6, flows into the space between the inner transition duct 12 and the outer transition duct 13, and convection-cools the inner transition duct 12 from its outer wall surface. Extraction air 103, which is obtained after the inner transition duct 12 is cooled, is extracted out of the main casing 6 through an extraction path 14, which is formed by the outer transition duct 13.

When water is added to the extraction air 103 in the humidificator 4, the extraction air 103 turns into humid air 104. The use of a wetted-wall column or humidification tower for humidification is known as an air humidification method.

The humid air 104, which is obtained upon water addition in the humidificator 4, is directed to the recuperator 5 and heated through heat exchange with turbine exhaust 107 (low-pressure combustion gas discharged from the turbine outlet). The resulting high-temperature air 105 is introduced into the combustor casing 7. The air in the combustor casing 7 flows toward the head of the combustor through a substantially circular space between the flow sleeve 11 and combustor liner 10, and is used to convection-cool the combustor liner 10 along the way. Part of the air flows into the combustor liner 10 through cooling air holes in the combustor liner 10 and is used for film cooling. The remaining air flows into the combustor liner through air holes provided downstream of the fuel nozzle 9, and turns into combustion gas 106 as it is used together with fuels (201-204) emitted from the fuel nozzle for combustion purposes. The high-temperature combustion gas 106 is conveyed to the turbine 3 through the inner transition duct 12. The low-pressure exhaust 107 discharged from the turbine 3 is heat-recovered by the recuperator 5, passed through an economizer 22, an exhaust reheater 23, and a water recovery system 24, and discharged from an exhaust tower 25 as exhaust 109. Water contained in the exhaust is recovered by the water recovery system 24 along the way. The water recovery method indicated in the figure sprays water onto a flue and allows the water in the gas to condense and drop for recovery purpose.

Driving force obtained by the turbine 3 is transmitted to the compressor 1 and power generator 20 through a shaft 21. Part of the driving force is used to compress air in the compressor 1. Further, the power generator 20 converts the driving force to electrical power.

The water recovered from the bottom of the water recovery system 24 and humidificator 4 is reused as atomization water for the water recovery system 24 or as humidification water for the humidificator 4. In such an instance, a water treatment device 26 removes impurities from the recovered water. The water treated by the water treatment device 26 is heated by exhaust in the economizer 22. The heated water is then supplied to the humidificator 4.

Fuel flow control valves 211-214 open/close to control the amount of generated electricity MW that is output from the humid air turbine. The power generator 20 inputs the amount of generated electricity MW into a control device 800. To regulate the amount of air humidification, a control valve 311 controls the amount of humidification water to be supplied to the humidificator 4. The control valve 311 is provided for a system that supplies water heated by the economizer 22 to the humidificator 4.

A temperature measurement device 801 is positioned downstream of the economizer 22 to measure the exhaust temperature. A temperature signal acquired by the temperature measurement device 801 enters the control device 800. The control device 800 transmits a signal for opening/closing the control valve 311, which controls the amount of humidification water to be supplied to the humidificator 4, and signals for opening/closing the fuel flow control valves 211-214, which control the fuel flow rate. FIG. 1 shows a control signal for fuel flow control valve 214 as a representative of the control signals to be transmitted from the control device 800 to the fuel flow control valves 211-214.

Figure 2:
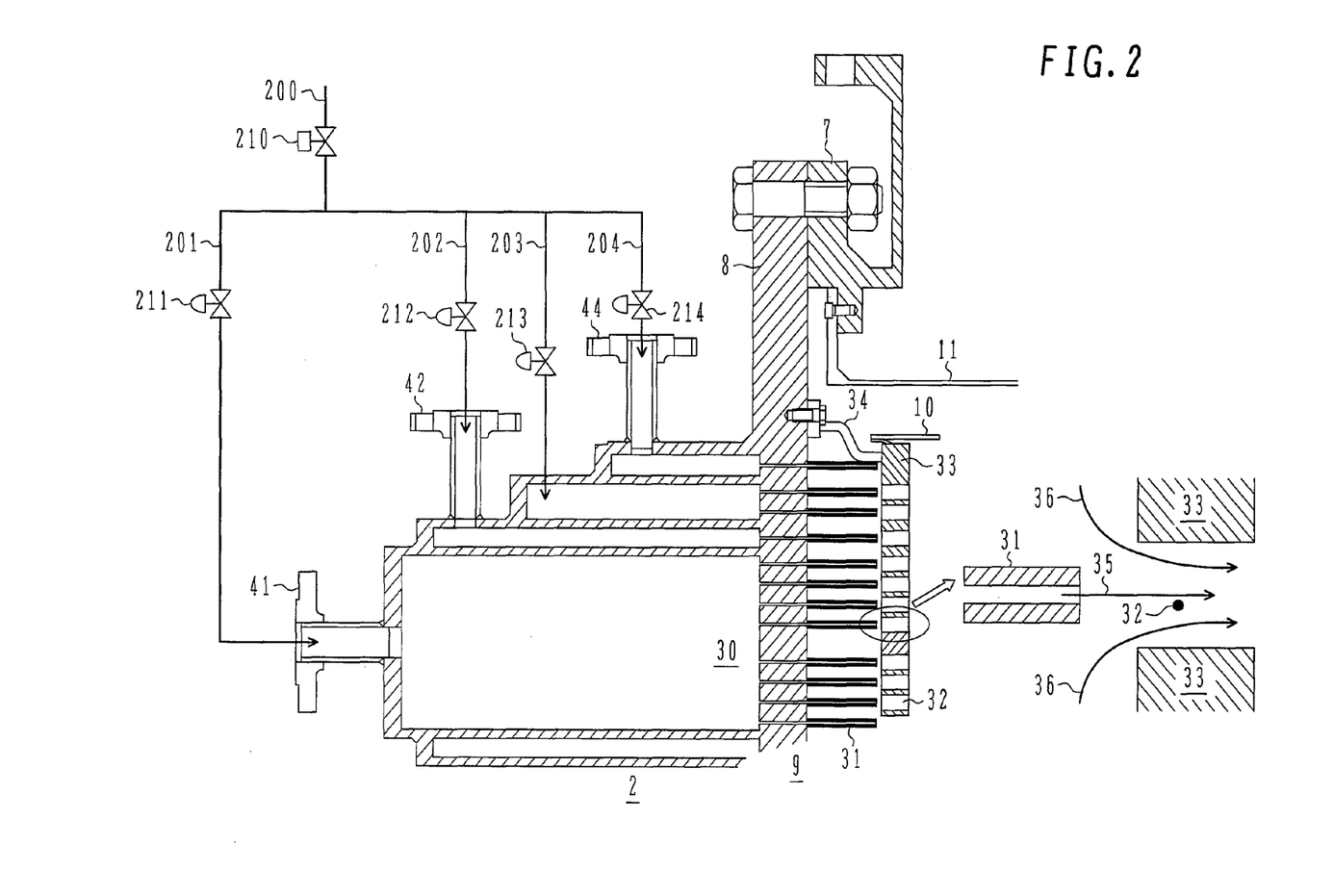
FIG. 2 shows the configuration of a low NOx combustor fuel nozzle according to the first embodiment of the present invention.

FIG. 2 shows the structure of the fuel nozzle 9 for use with the present embodiment.

A fuel header 30 for the combustor cover 8 is provided with many fuel nozzles 31. An air hole plate 33 is provided with small-diameter air holes 32, each of which corresponds to each fuel nozzle 31, and mounted on the combustor cover 8 via a support 34.

Coaxial jets, which include a fuel jet 35 at the center and a circular air flow 36 surrounding the fuel jet, gush out of the air holes 32. The coaxial jets inhibit the fuel from mixing with the air within the air holes 32. This suppresses the autoignition of fuel within the air holes even when the combustion air temperature is high as in the humid air turbine. Consequently, a highly reliable combustor is obtained without melting down the air hole plate 33.

Further, since a large number of small coaxial jets are formed to increase the mixing surface between fuel and air, the mixture of fuel and air is promoted to reduce the amount of NOx generation. As a result, the humid air turbine can not only reduce the amount of NOx generation, but also assure stable combustion.

Figure 3:
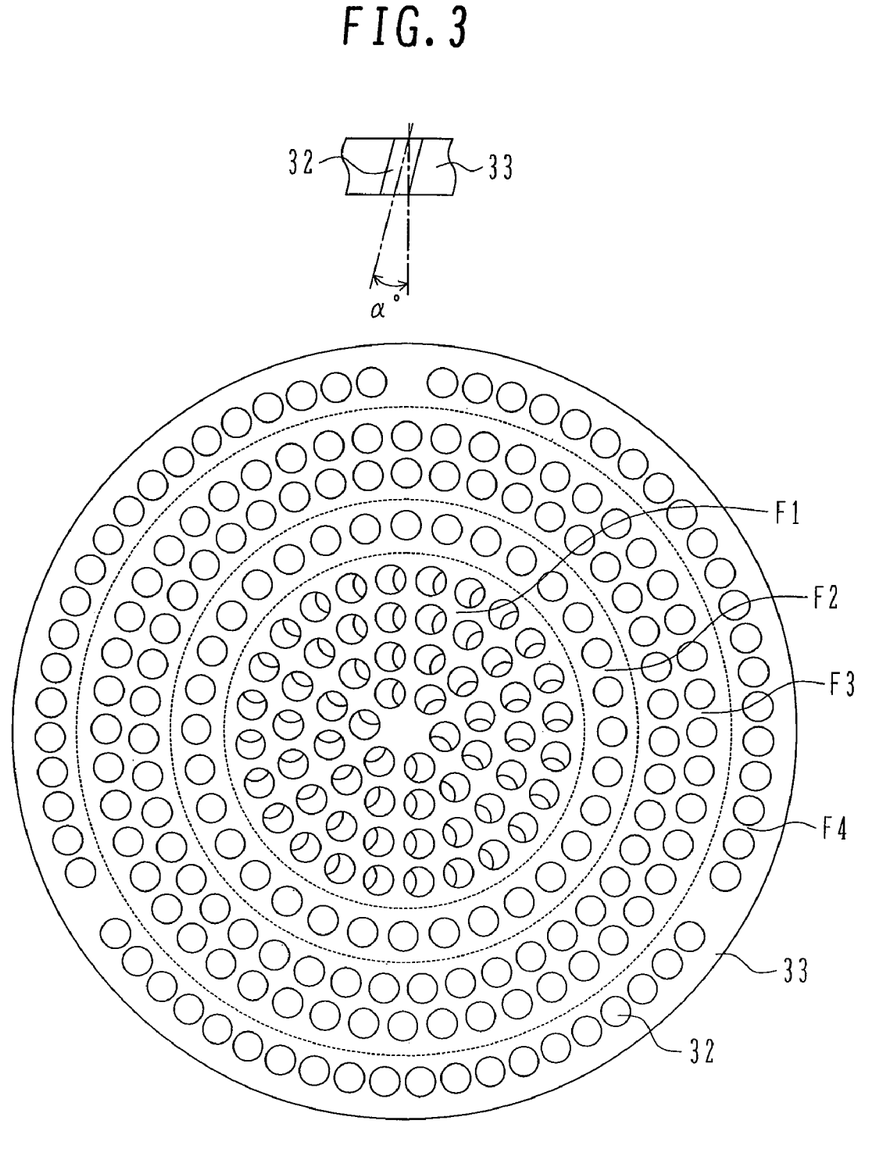
FIG. 3 shows details of the low NOx combustor fuel nozzle according to the first embodiment of the present invention.

FIG. 3 is a view of the air hole plate 33 taken from the downstream side of the combustor. In the present embodiment, there are eight concentric rows of many air holes (and fuel nozzles that are not shown in the figure but make pairs with the air holes). The first four rows (the first to fourth rows) from the center are classified as a first group (F1). The fifth row is classified as a second group (F2). The outer two rows (the sixth and seventh rows) are classified as a third group (F3). The outermost row (the eighth row) is classified as a fourth group (F4). For each of groups F1 to F4, fuel is supplied through flanges 41-44 provided for the fuel header 30, as shown in FIG. 2. As the fuel system is divided into groups as described above, fuel staging can be performed to gradually vary the number of fuel nozzles for fuel supply in accordance with turbine load changes. This not only provides enhanced combustion stability during a partial load operation of the turbine, but also achieves NOx reduction.

The four central rows (F1) of air holes are angled in the tangential direction of pitch circle (at α° in FIG. 3 and at 15° in the present embodiment). These air holes are angled in this manner to whirl all the coaxial jets. The resulting circulating flow provides flame stability. As regards the outer rows (F2-F4) surrounding row F1, flame stability is provided by the combustion heat of a central F1 burner.

Figure 4:
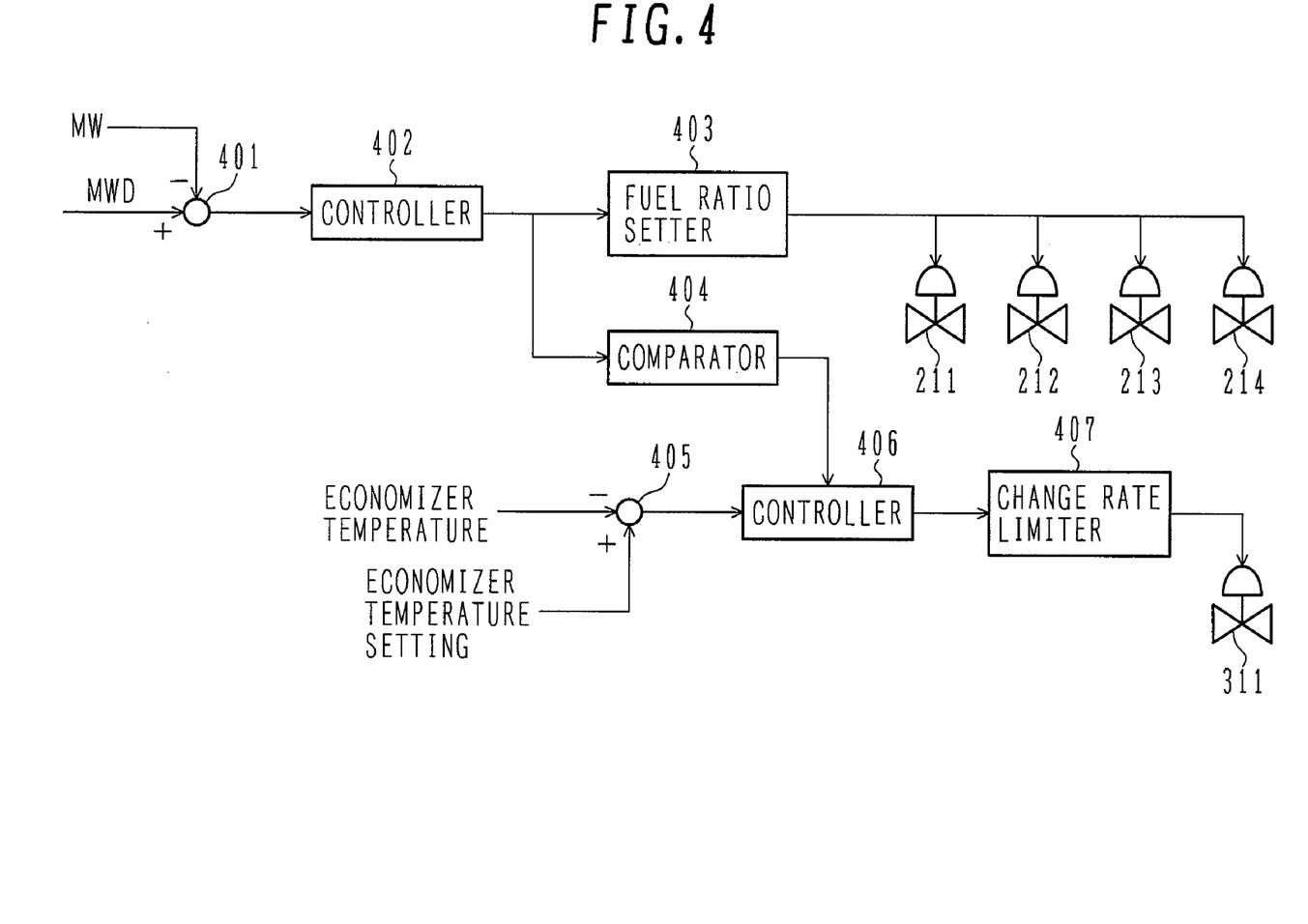
FIG. 4 shows a typical control method for the humid air turbine according to the first embodiment of the present invention.

FIG. 4 shows an example illustrating load/water addition control of the humid air turbine according to the present embodiment. It depicts a control process that is performed by the control device 800.

A subtractor 401 determines the difference between a load demand MWD, which is transmitted from a central command center 900 (FIG. 1) in accordance with a predetermined power generation amount increase rate, and an actual power generation amount MW, which is transmitted from the power generator 20. A controller 402 then computes a fuel flow rate command value. A fuel ratio setter 403 plays a role of determining the fuel flow rates for groups F1 to F4 in accordance with the fuel flow rate command value received from the controller 402. The fuel ratio setter 403 determines the fuel flow rates for groups F1 to F4 and the associated valve openings. The fuel flow control valves 211-214 are then controlled accordingly.

Meanwhile, a comparator 404 judges the water addition start time for water supply to the humidificator 4 in accordance with the fuel flow rate command value calculated by the controller 402. When the water addition start time arrives, the comparator 404 issues a water supply start instruction to a controller 406.

Figure 5:
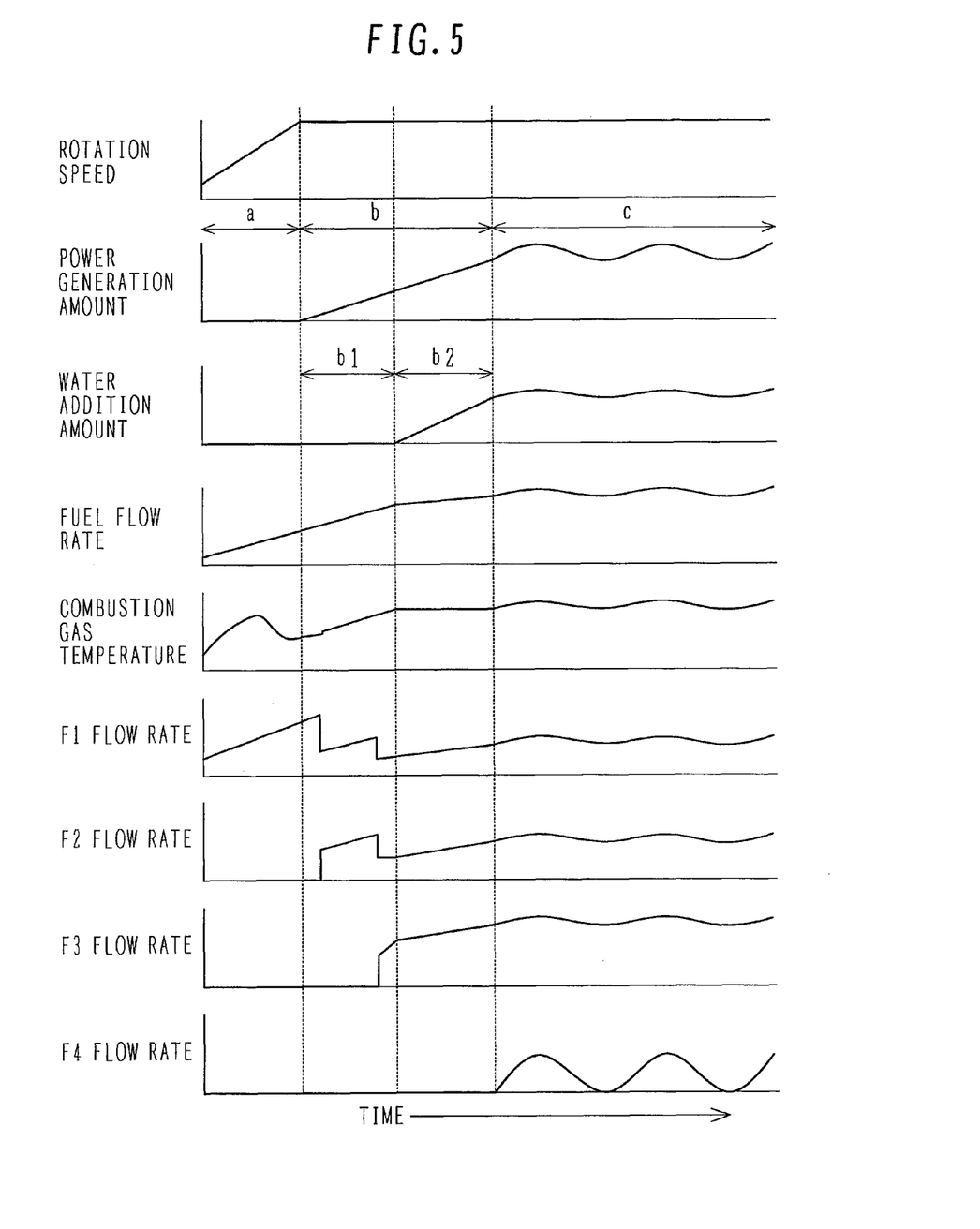
FIG. 5 shows a typical operating method for a humid air turbine system according to the first embodiment of the present invention.

After the start of water supply, a subtractor 405 calculates the difference between a temperature setting for the exhaust discharged from the economizer 22 and an actual temperature derived from the temperature measurement device 801. The temperature setting is predetermined and stored in the control device 800. The controller 406 determines the opening of the control valve 311 in accordance with a signal indicating the above-mentioned temperature difference. The value of a change rate limiter 407 is predetermined so that a water addition amount increase rate agrees with a predetermined value. As described above, the amount of moisture to be supplied to the humidificator is adjusted in accordance with the temperature of the gas discharged from the economizer. This makes it possible to obtain a substantially constant combustion temperature during a water addition amount increase, thereby providing a low NOx combustor and assuring flame stability FIG. 5 shows a combustor operating method. The horizontal axis of FIG. 5 indicates the elapsed time from the beginning of startup. From top to bottom, the vertical axis of FIG. 5 schematically indicates the rotation speed, the power generation amount, the water addition amount representing the amount of water supplied to the humidificator, the fuel flow rate (200), the combustion gas temperature, and F1 to F4 fuel flow rates. Period a is a rotation speed rise period, which is an interval between the instant at which startup is performed and the instant at which the full speed is attained. Period b is a load increase period for turbine startup. Period c is a load following operation period after the end of startup. The load increase period b is divided into the first half and the second half. The first half is a no-water-addition period b1, whereas the second half is a water addition amount increase period b2.

First of all, only the central group (F1) is used for operation (that is, the fuel is supplied to fuel system 201 only) when the fuel flow rate is relatively low for ignition and speed increase purposes (period a). This operation is performed until the speed substantially rises to a full-speed no-load condition region. This F1-only combustion is hereinafter referred to as the 1/4 mode.

During a subsequent load increase process (period b1), fuel is supplied to group F2 at the outer circumference of group F1 as well as group F1 so that an operation is performed with groups F1 and F2. In other words, the fuel is supplied to fuel systems 201 and 202 so that fuel flow control valves 211 and 212 control the associated fuel flow rates. This mode of operation is hereinafter referred to as the 2/4 mode.

Next, fuel is supplied to a surrounding fuel system 203 so that group F3 is ignited (period b2). This mode of operation is referred to as the 3/4 mode. As regards the fuel flow rate increase for the 3/4 mode, fuel flow control valves 211, 212, and 213 exercise fuel flow rate control so that the turbine power generation amount increases in accordance with a load increase rate predefined in a turbine startup plan. Further, the fuel flow rates for the F1, F2, and F3 systems are determined in predefined proportions so as to assure combustion stability with the NOx generation amount minimized.

It should be noted that no water is added to the humidificator 4 during periods a and b1. In the present embodiment, the water addition to the humidificator 4 begins in the 3/4 mode. The control valve 311 for the humidificator 4 opens at a predetermined rate so that the water supply flow rate gradually increases in accordance with the valve opening. The fuel flow rate prevailing in this instance is also controlled so that the turbine power generation amount increases in accordance with a load increase rate predefined in the turbine startup plan. Since the amount of moisture to be supplied to the humidificator 4 is adjusted in accordance with a temperature signal derived from the temperature measurement device 801, it is possible to achieve load increase and humidification while the combustion gas temperature remains substantially unchanged. Subsequently, the water supply amount 301 for the humidificator 4 or the opening of the control valve 311 reaches a predetermined value to complete the startup of the humid air turbine. For example, the water supply amount prevailing after completion of startup can be controlled so that the temperature of the gas 108 discharged from the economizer agrees with a predetermined temperature.

Subsequently, a load following operation is performed as the fuel flow rate increases/decreases in accordance with load increase/decrease (period c). When a high-load operation is performed, mainly the fuel flow rate for the outermost group (F4) is adjusted as appropriate. In this instance, a mixture of F4 fuel and air mixes with the F1 to F3 combustion gases and reaches a high temperature. Therefore, fuel oxidization progresses to provide high combustion efficiency. Further, since air distribution is set up so that the temperature prevailing after completion of combustion is not higher than a temperature (approximately 1600° C.) at which significant NOx generation occurs, combustion can be achieved in such a manner that the amount of NOx generation from group F4 is reduced to substantially zero. Furthermore, since reaction is completed even when a slight amount of F4 fuel is supplied, a fuel changeover can be successively made to provide improved operability.

Figure 6:
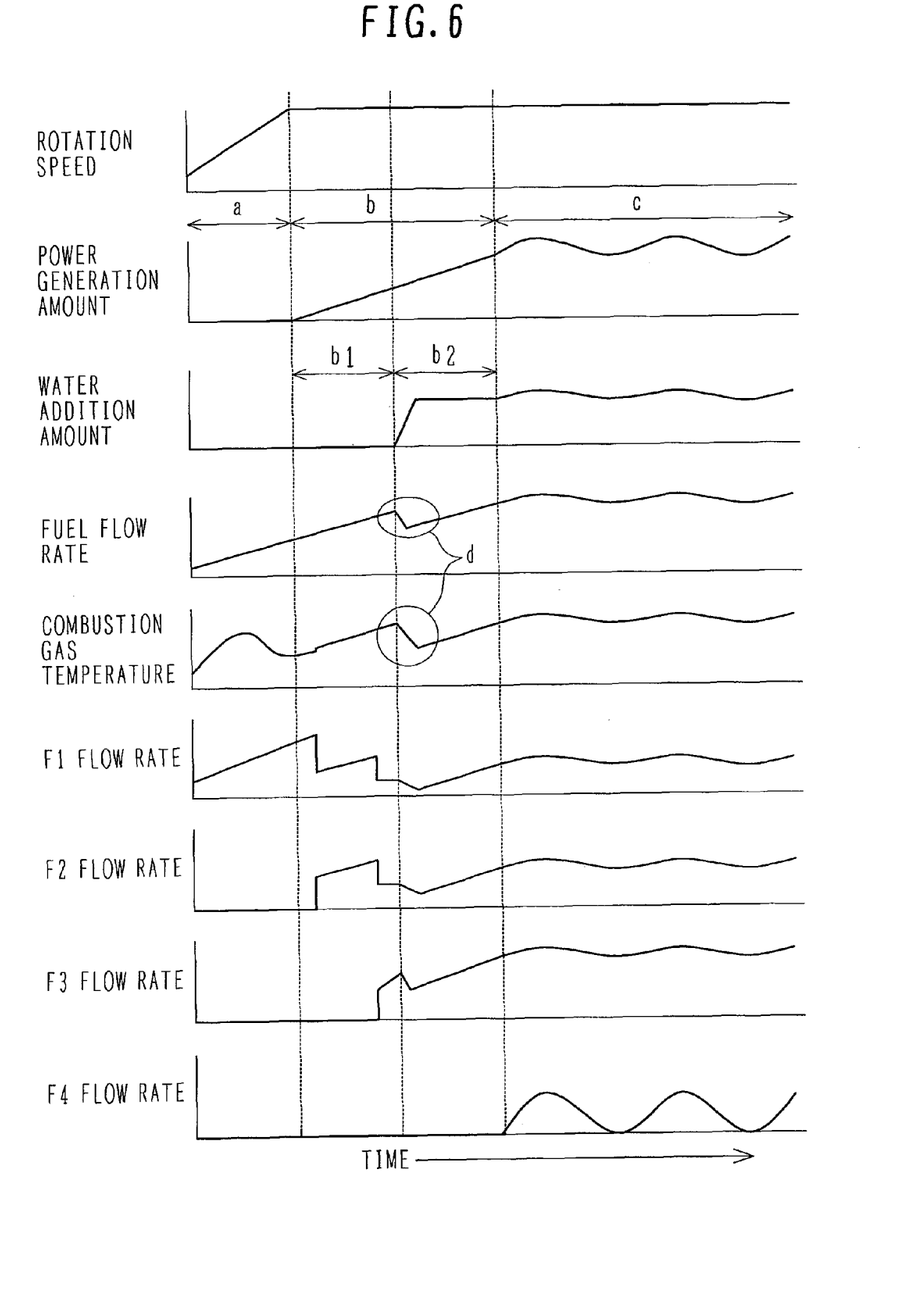
FIG. 6 is an operating method diagram illustrating a problem indicated in a comparison example.

FIG. 6 shows a comparison example illustrating a problem that occurs when the present invention is not used. When the water addition amount is increased irrespective of a power generation amount increase (period b2), the water addition amount increase rate is generally higher than a preset power generation amount increase rate. Therefore, the fuel flow rate needs to be temporarily decreased so that a predetermined power generation amount increase rate is attained at point d in FIG. 6. As a result, the combustion gas temperature lowers so that combustion stability decreases. In this instance, the size of the air holes 32 can be reduced to raise a local fuel-air ratio for the purpose of improving flame stability prevailing after water addition. However, if the diameter of the air holes 32 is reduced, the combustion temperature prevailing before water addition rises due to an increase in a local fuel-air ratio, thereby increasing the NOx generation amount.

Since the degree of combustion gas temperature variation before and after the start of water addition can be reduced as indicated in FIG. 6, the present invention makes it possible to reduce the amount of NOx generation before water addition and assure combustion stability after water addition. Further, since load increase and water addition during turbine startup are simultaneously accomplished, the time required for humid air turbine startup can be reduced.

The present embodiment assumes that the temperature measurement device 801 is positioned downstream of the economizer 22. However, the temperature measurement device 801 may be positioned at an alternative place in a flow path between the combustor 2 and exhaust tower 25.

Second Embodiment

Figure 7:
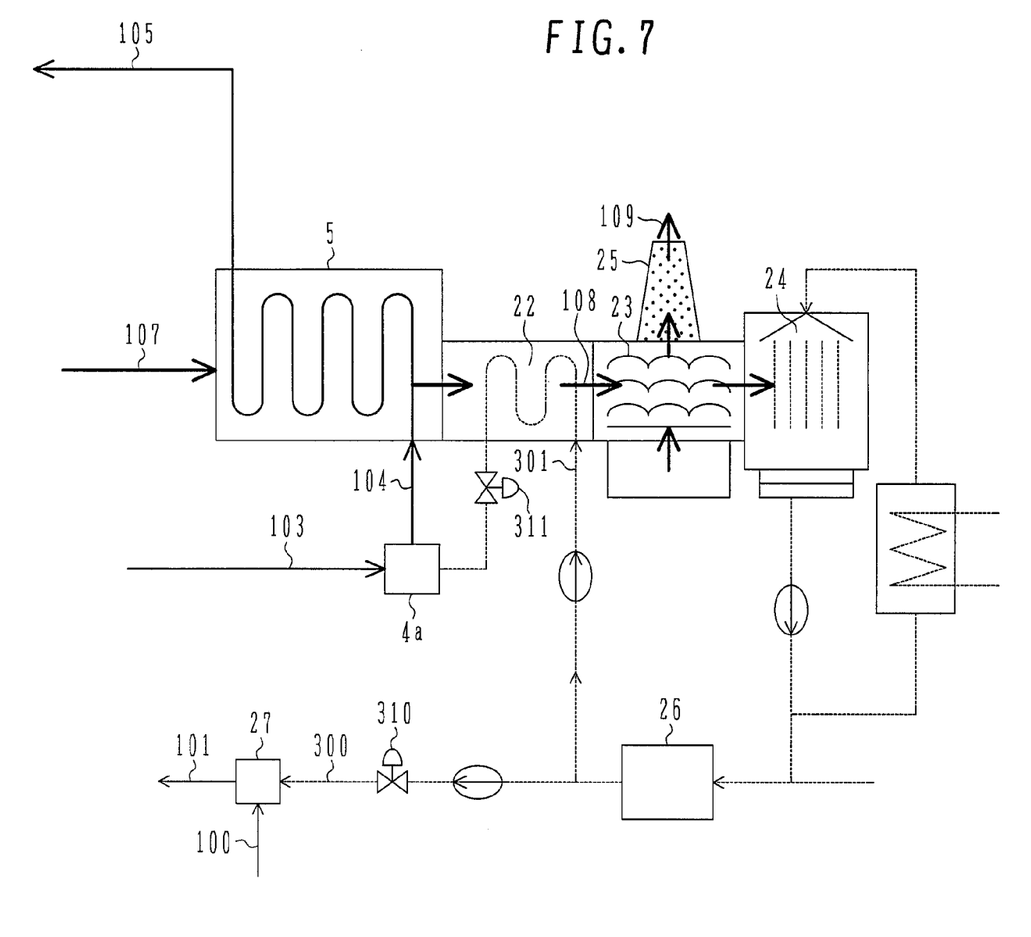
FIG. 7 is a system flow diagram illustrating the configuration of the humid air turbine according to a second embodiment of the present invention.
Figure 8:
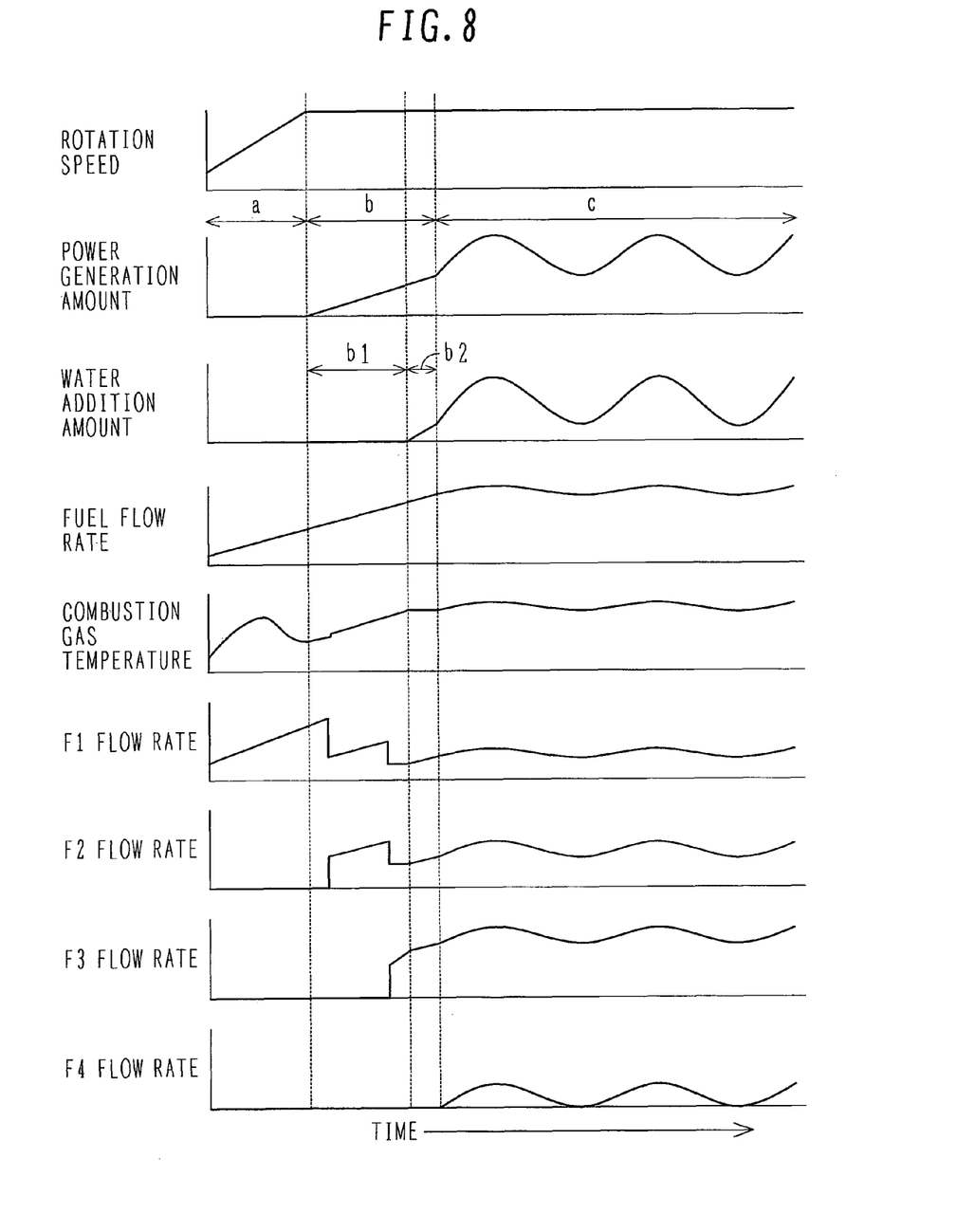
FIG. 8 shows a typical operating method for the humid air turbine according to the second embodiment of the present invention.
Figure 9:
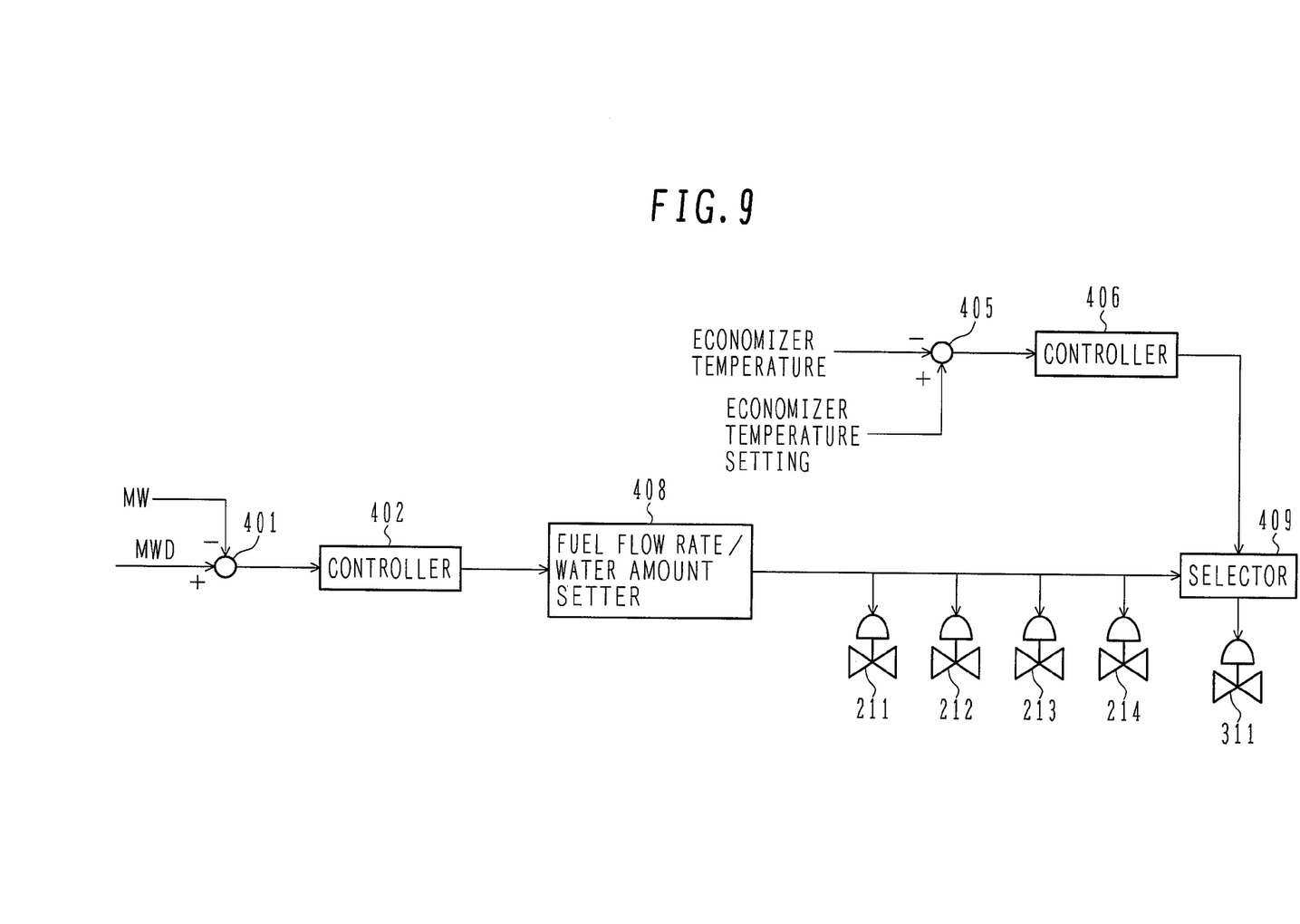
FIG. 9 shows a typical control method for the humid air turbine according to the second embodiment of the present invention.

A second embodiment of the present invention will now be described with reference to FIGS. 7 to 9. FIG. 7 corresponds to FIG. 1 for the first embodiment. FIG. 8 corresponds to FIG. 5. FIG. 9 corresponds to FIG. 4.

FIG. 7 differs from FIG. 1 in that the humidificator 4 installed in a flow path for the extraction air 103 is replaced by a water atomizer 4a. In this connection, a circulation water system for discharging water from the bottom of the humidificator 4 is also unnecessary.

In the first embodiment, the water supply amount 301 for the humidificator 4 is larger than the amount of water that is evaporated inside the humidificator 4 and added to the humid air 104. The amount of evaporation in the humidificator 4 is determined by the temperature and pressure of air and water and the evaporation area of the humidificator 4. Therefore, the amount of moisture in the humid air 104 cannot be minutely adjusted.

On the other hand, the water atomizer 4a used in the present embodiment operates so that the supplied water is entirely evaporated and added to air. Therefore, the amount of moisture in the humid air 104 can be minutely adjusted by controlling the water supply amount 301. Thus, control can be exercised so that the water addition amount considerably increases/decreases in accordance with an increase/decrease in the amount of power generation. Consequently, the present embodiment can shift the load following operation period C toward a small power generation amount side, as compared to the first embodiment, and enlarge the operation load range of the humid air turbine. When, in this instance, the increase/decrease in the water addition amount follows the increase/decrease in the power generation amount, the amount of combustion gas temperature increase/decrease reduces, thereby making it possible to maintain a small NOx generation amount and provide improved combustion stability.

FIG. 9 shows an example illustrating load/water addition control of the humid air turbine according to the present embodiment. It depicts an internal system of the control device 800 (FIG. 1).

The subtractor 401 determines the difference between a load demand MWD, which is given to comply with a predetermined power generation amount increase rate, and an actual power generation amount MW. The controller 402 then computes a fuel flow rate command value. A fuel flow rate/water amount setter 408 determines the F1 to F4 fuel flow rates and the associated valve openings. The fuel flow control valves 211-214 are then controlled accordingly. Further, the water supply amount 301 and the associated opening of the control valve 311 are simultaneously determined. A substantially constant combustion temperature can then be maintained irrespective of an increase/decrease in the amount of water to achieve the object of the present invention.

A subtractor 405 computes the difference between a temperature setting for the exhaust discharged from the economizer 22 and an actual temperature. The controller 406 determines the optimum opening of the control valve 311 in consideration of system efficiency. A selector 409 compares the valve opening derived from the controller 406 against the valve opening derived from the fuel flow rate/water amount setter 408 to determine either a combustion performance characteristic or system efficiency has higher priority, thereby determining the optimum water supply amount.

The embodiments of the present invention have been described with reference to a combustor that uses a method of injecting many small-diameter coaxial jets of fuel and air into the combustion chamber as described in Japanese Patent JP-A-2003-148734. In a situation where combustion air is heated to a high temperature by a recuperator as in a humid air turbine, it is necessary to reduce the NOx generation amount by properly controlling the flame temperature while preventing the autoignition of fuel. A combustor for generating many small-diameter coaxial jets of fuel and air is suitable for use with the present invention because backfire to the air hole is hard to be occurred. If fuel is sparingly supplied in relation to the combustion air for the head of a combustor, a conditional change caused by water addition to the humid air turbine seriously affects NOx generation and flame stability of the combustor. Therefore, the present invention is remarkably effective in reducing the NOx generation amount and assuring combustion stability.

However, even when, for instance, the humid air turbine uses a low NOx combustor that includes a plurality of premix burners positioned around a central diffusion flame burner as described in JP-A-1995-280267 or uses a combustor that includes a plurality of premix burners positioned around a central diffusion flame pilot burner as described in JP-A-2003-120934, water addition also incurs a great conditional change in relation to the NOx generation and flame stability of the combustor. Therefore, the present invention can be effectively applied to the above-mentioned low NOx combustor.

The present invention can be used not only as a high-efficiency turbine for power generation, but also as a cogeneration system for simultaneous generation of heat and electricity or a machine drive engine for a pump, compressor, or other machine.

What is claimed is:

1. A humid air turbine having a compressor for compressing air, a humidificator for generating humid air by adding moisture to compressed air supplied from the compressor, a combustor for generating combustion gas by allowing the humid air and fuel to mix and burn, a turbine driven by the combustion gas, a recuperator for effecting heat exchange between exhaust from the turbine and the humid air, an economizer for effecting heat exchange between exhaust from the recuperator and water, and a system for supplying the water heated by the economizer to the humidificator, the humid air turbine comprising:
a control device for adjusting an amount of water to be supplied from the economizer to the humidificator so that a temperature of the combustion gas in the combustor remains substantially constant at a preset load increase rate, when the water supply to the humidificator begins.

2. The humid air turbine according to claim 1, wherein said control device precalculates and adjusts a rate of increase in the amount of water to be supplied from the economizer to the humidificator so that the temperature of the combustion gas in the combustor remains substantially constant at the preset load increase rate.

3. A humid air turbine control system having a compressor for compressing air, a humidificator for generating humid air by adding moisture to compressed air supplied from the compressor, a combustor for generating combustion gas by allowing the humid air and fuel to mix and burn, a turbine driven by the combustion gas, a recuperator for effecting heat exchange between exhaust from the turbine and the humid air, an economizer for effecting heat exchange between exhaust from the recuperator and water, a temperature measurement device for measuring the temperature of exhaust discharged from the economizer, and a system for supplying the water heated by the economizer to the humidificator, the humid air turbine control system comprising:
a first controller for calculating a fuel flow rate in accordance with a load demand for the humid air turbine and a power generation amount; and
a second controller for adjusting an amount of moisture to be supplied to the humidificator so that a temperature of the combustion gas in the combustor remains substantially constant in accordance with the temperature of exhaust located downstream of the economizer and the fuel flow rate.

4. A method for controlling a humid air turbine having a compressor for compressing air, a humidificator for generating humid air by adding moisture to compressed air supplied from the compressor, a combustor for generating combustion gas by allowing the humid air and fuel to mix and burn, a turbine driven by the combustion gas, a recuperator for effecting heat exchange between exhaust from the turbine and the humid air, an economizer for effecting heat exchange between exhaust from the recuperator and water, and a system for supplying the water heated by the economizer to the humidificator, comprising:
adjusting an amount of water to be supplied from the economizer to the humidificator so that a temperature of the combustion gas in the combustor remains substantially constant at a preset load increase rate.

5. The method for controlling a humid air turbine according to claim 4, wherein the humid air turbine having a temperature measurement device for measuring a temperature of exhaust discharged from the economizer, the method further comprising:
a first step of calculating a fuel flow rate in accordance with a load demand for the humid air turbine and a power generation amount;
a second step of determining a timing for supplying moisture to the humidificator in accordance with the fuel flow rate; and
a third step of adjusting an amount of moisture to be supplied to the humidificator in accordance with the temperature of exhaust located downstream of the economizer and the fuel flow rate.

6. A method for controlling a humid air turbine having a compressor for compressing air, a humidificator for generating humid air by adding moisture to compressed air supplied from the compressor, a combustor for generating combustion gas by allowing the humid air and fuel to mix and burn, a turbine driven by the combustion gas, a recuperator for effecting heat exchange between exhaust from the turbine and the humid air, an economizer for effecting heat exchange between exhaust from the recuperator and water, and a system for supplying the water heated by the economizer to the humidificator, comprising:
precalculating a rate of increase in an amount of water to be supplied from the economizer to the humidificator; and
adjusting said rate of increase in the amount of water so that a temperature of the combustion gas in the combustor remains substantially constant at a preset load increase rate.

* * * * *